(12) United States Patent
Miller et al.

(10) Patent No.: US 7,597,874 B1
(45) Date of Patent: *Oct. 6, 2009

(54) PREPARATION OF ZEOLITES USING NOVEL STRUCTURE DIRECTING AGENTS

(75) Inventors: Stephen J. Miller, San Francisco, CA (US); Lun-Teh Yuen, Orinda, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/144,565

(22) Filed: Jun. 23, 2008

(51) Int. Cl.
*C01B 39/00* (2006.01)

(52) U.S. Cl. ............... 423/706; 423/700; 423/701; 423/702; 423/704; 423/705

(58) Field of Classification Search ......... 423/700–718, 423/327.1
See application file for complete search history.

(56) References Cited

U.S. PATENT DOCUMENTS

| | | | |
|---|---|---|---|
| 3,140,249 A | 7/1964 | Plank et al. | |
| 3,140,251 A | 7/1964 | Plank et al. | |
| 3,140,253 A | 7/1964 | Plank et al. | |
| 4,544,538 A | 10/1985 | Zones | |
| 4,963,337 A | 10/1990 | Zones | |
| 5,316,753 A | 5/1994 | Nakagawa | |
| 5,558,851 A * | 9/1996 | Miller | 423/702 |
| 5,653,956 A | 8/1997 | Zones | |
| 5,707,600 A | 1/1998 | Nakagawa et al. | |
| 5,707,601 A | 1/1998 | Nakagawa et al. | |
| 5,785,947 A | 7/1998 | Zones et al. | |
| 7,022,308 B1 | 4/2006 | Yuen et al. | |
| 7,067,108 B2 * | 6/2006 | Mertens et al. | 423/709 |
| 2004/0234449 A1* | 11/2004 | Pasquale et al. | 423/707 |
| 2008/0159950 A1* | 7/2008 | Miller et al. | 423/704 |
| 2008/0159951 A1* | 7/2008 | Miller et al. | 423/704 |
| 2008/0159952 A1* | 7/2008 | Miller et al. | 423/706 |

FOREIGN PATENT DOCUMENTS

EP    0162719 A2    11/1985

OTHER PUBLICATIONS

R. Szostak, Theta -3 (MTW), Handbook of Molecular Sieves, 1992, p. 464, Van Nostrand Reinhold, New York, USA.
Burton and Zones, Organic Molecules in Zeolite Synthesis: Their Preparation and Structure-Directing Effects, Studies in Surface Science and Catalysis, 2007, pp 137-179, vol. 168, Elsevier B.V.

* cited by examiner

*Primary Examiner*—Roy King
*Assistant Examiner*—Xiaobei Wang
(74) *Attorney, Agent, or Firm*—Michael D. Ross

(57) ABSTRACT

The present invention is directed to a process for producing crystalline zeolites from a reaction mixture containing an N,N,N-trialkyl benzyl quaternary ammonium cation as a structure directing agent.

20 Claims, 5 Drawing Sheets

US 7,597,874 B1

PREPARATION OF ZEOLITES USING NOVEL STRUCTURE DIRECTING AGENTS

FIELD OF THE INVENTION

The present invention is directed to a process for producing crystalline zeolites from a reaction mixture containing an N,N,N-trialkyl benzyl quaternary ammonium cation as a structure directing agent ("SDA").

BACKGROUND OF THE INVENTION

Crystalline zeolites of the chabazite (CHA) framework type, and in particular SSZ-13 (referred to as "zeolite SSZ-13" or simply "SSZ-13"), are commercially useful as catalysts and adsorbents. Synthetic zeolites having a CHA framework type are usually prepared from an aqueous reaction mixture containing an alkali or alkaline earth metal cation, a solvated tetravalent element (e.g., $Si^{4+}$), optionally a solvated trivalent element (e.g., $Al^{3+}$), and an organic SDA, usually an organic quaternary ammonium cation.

Organic quaternary ammonium cation SDAs are known. For example, U.S. Pat. No. 4,544,538, issued Oct. 1, 1985 to Stacey Zones, discloses a method for synthesizing zeolite SSZ-13 using an SDA derived from 1-adamantamine, 3-quinuclidinol, or 2-exo-aminonorbornane. U.S. Pat. No. 4,544,538 to Stacey Zones describes a method of synthesizing zeolite SSZ-13 using a N,N,N-trimethyl-1-adamantammonium cation as a structure directing agent. However, known quaternary ammonium SDAs suitable for synthesis of zeolites of satisfactory purity are costly because of their exotic structures. The cost-effectiveness of the SDA is an important parameter for commercial zeolate manufacturing. Therefore, there is a current need for new, lower-cost quaternary ammonium SDAs which are suitable for synthesizing zeolites of satisfactory purity.

SUMMARY OF THE INVENTION

The present invention is directed to a method for preparing a crystalline zeolite of the CHA framework type, which includes the steps of:

(1) preparing an aqueous reaction mixture from:
  (a) at least one active source of an oxide of a tetravalent element (represented herein by composition variable Y) or mixture of active sources of oxides of different tetravalent elements (e.g. active sources $Y^1_aO_{2a}$, $Y^2_aO_{2a}$ ... $Y^x_aO_{2a}$, wherein $Y^1$, $Y^2$ ... $Y^x$ are different elements),
  (b) at least one active source of an oxide of a trivalent element, a pentavalent element, a second tetravalent element which is different from the tetravalent element selected for composition variable Y, or a mixture thereof (the trivalent, pentavalent and second tetravalent elements collectively represented herein by composition variable W),
  (c) at least one active source of an element selected from Groups 1 ($M^+$) and 2 ($M^{2+}$) of the Periodic Table, and mixtures thereof,
  (d) water as a solvent,
  (e) seed crystals capable of forming the zeolite, and
  (f) a SDA (represented by composition variable R) in an amount sufficient to form crystals of the zeolite, wherein the SDA is an N,N,N-trialkyl benzyl quaternary cation described herein below by general structural formula (1); and (2) heating the reaction mixture under crystallization conditions for sufficient time to form the zeolite.

DETAILED DESCRIPTION OF THE INVENTION

Figure 1:
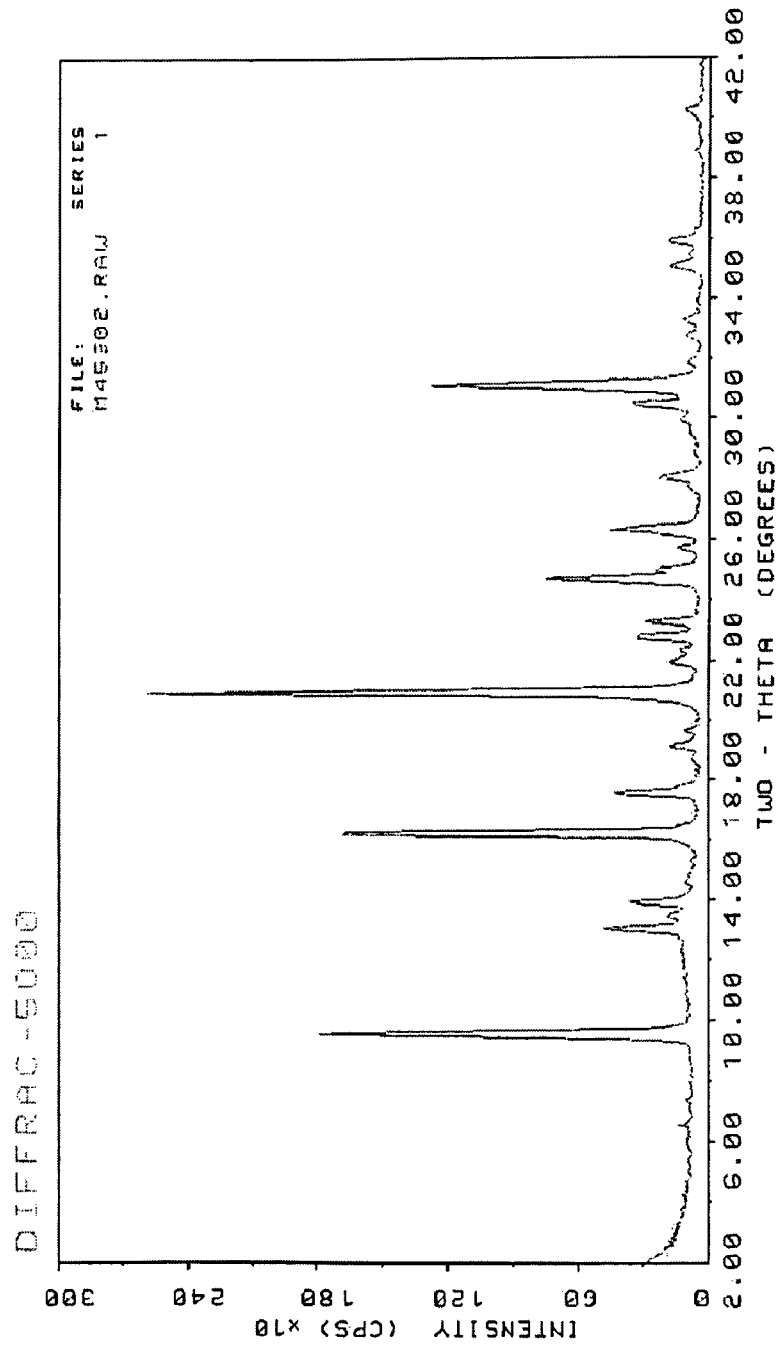
FIG. 1 shows the results of an x-ray powder diffraction analysis of a zeolite prepared per Example 1.

While the invention is susceptible to various modifications and alternative forms, specific embodiments of the invention are described in detail. It should be understood, however, that the descriptions of specific embodiments are not intended to limit the invention to the particular forms disclosed. On the contrary, the intent is to cover all modifications, equivalents, and alternatives falling within the spirit and scope of the invention as defined by the appended claims.

Where permitted, all publications, patents and patent applications cited in this application are herein incorporated by reference in their entirety, to the extent such disclosure is not inconsistent with the present invention.

Unless otherwise specified, the recitation of a genus of elements, materials or other components, from which an individual component or mixture of components can be selected, is intended to include all possible sub-generic combinations of the listed components and mixtures thereof. Also, "include" and its variants, are intended to be non-limiting, such that recitation of items in a list is not to the exclusion of other like items that may also be useful in the materials, compositions and methods of this invention.

Definitions

The term "active source" means a reagent or precursor material capable of supplying an element in a form that can react and be incorporated into the target zeolite structure. The terms "source" and "active source" are used interchangeably herein.

The term "alkyl groups" refers to both straight- and branched-chain alkyl groups. The term "lower alkyl groups" refers to alkyl groups having from 1 to 6 carbon atoms ($C_1$-$C_6$) and includes primary, secondary and tertiary alkyl groups. Typical lower alkyl groups include, for example, methyl, methyl, n-propyl, isopropyl, n-butyl, sec-butyl, t-butyl, n-pentyl, iso-pentyl, n-hexyl and the like.

The term "framework type" is used to describe the topology and connectivity of the tetrahedrally coordinated atoms constituting the framework of the zeolite and makes an abstraction of the specific properties for the zeolite. Zeolites for which a structure has been established are assigned a three letter code and are described in "Atlas of Zeolite Framework Types," Ch. Baerlocher, L. B. McCusker and D. H. Olson, Elsevier, 2007.

The term "Periodic Table" refers to the version of IUPAC Periodic Table of the Elements dated June 22, 2007, and the numbering scheme for the Periodic Table Groups is as described in Chemical and Engineering News, 63(5), 27 (1985).

Reaction Mixtures

Crystalline zeolites prepared by the methods describe herein are of the CHA framework type and have a mole ratio greater than 1 of (1) an oxide of a first tetravalent element to (2) an oxide of a trivalent element, pentavalent element, second tetravalent element which is different from the first tetravalent element, or a mixture thereof.

In one embodiment, the oxide (1) to oxide (2) mole ratio is in the range about 15:1 to about 50:1. In another embodiment, the oxide (1) to oxide (2) mole ratio is in the range about 20:1 to about 35:1.

The zeolite is synthesized from a reaction mixture formed from:

(a) at least one active source of an oxide of a tetravalent element (Y) or mixture of active sources of oxides of different tetravalent element (e.g. active sources $Y^1_aO_{2a}$, $Y^2_aO_{2a}$ ... $Y^x_aO_{2a}$, wherein $Y^1$, $Y^2$ ... $Y^x$ are different elements), (b) at least one active source of an oxide of a trivalent element, a pentavalent element, a tetravalent element which is different from the tetravalent element selected for Y (collectively referred to as W), or a mixture thereof, (c) at least one active source of an element selected from Groups 1 ($M^+$) and 2 ($M^{2+}$) of the Periodic Table (collectively referred to herein as $M^{n+}$), and mixtures thereof, (d) water as a solvent, (e) seed crystals capable of forming the zeolite, and (f) a SDA (R) in an amount sufficient to form crystals of the zeolite, wherein the SDA is an N,N,N-trialkyl benzyl quaternary ammonium salt described herein below by general structural formula (1).

The composition of the reaction mixture from which the zeolite is formed, in terms of elemental molar ratios and seed weight percent, has the following composition ranges:

TABLE 1

| Reactants | | Subembodiment |
|---|---|---|
| Y/W molar ratio | 1-∞ | 10-75 |
| $M^{n+}$/Y molar ratio | 0.05-5 | 0.3-0.6 |
| R/Y molar ratio | 0.001-0.5 | 0.01-0.3 |
| $OH^-$/Y molar ratio | 0.1-1.0 | 0.3-0.7 |
| $H_2O$/Y molar ratio | 2-100 | 10-20 |
| Seed* | 0.5-10 wt % | 1-5 wt % |

*The weight percent of the seed is based on the weight percent of active source for Y.

For each embodiment described herein, Y is selected from the group consisting of elements from Groups 4-14 of the Periodic Table. In one subembodiment, Y is selected from the group consisting of Ge, Si, and mixtures thereof. In another subembodiment, Y is Si. Sources of elements selected for composition variable Y and the second tetravalent element (represented by composition variable W) include oxides, hydroxides, acetates, oxalates, ammonium salts and sulfates of the element(s) selected for Y and (optionally) W. In one subembodiment, each active source(s) of the element(s) selected for composition variable Y and W is an oxide. Where Y is Si, sources useful herein include fumed silica, precipitated silicates, silica hydrogel, silicic acid, colloidal silica, tetra-alkyl orthosilicates, and silica hydroxides.

For each embodiment described herein, W is selected from the group consisting of elements from Groups 3-13 of the Periodic Table. In one subembodiment, W is selected from the group consisting of Ga, Al, Fe, B, Ti, In, and mixtures thereof. In another subembodiment, W is Al. In another subembodiment, W is B. Sources of elements selected for composition variable W include oxides, hydroxides, acetates, oxalates, ammonium salts and sulfates of the element(s) selected for W. Typical sources of aluminum oxide ($Al_2O_3$) when used in the reaction mixture include aluminates, alumina, and aluminum compounds such as $AlCl_3$, $Al_2(SO_4)_3$, aluminum hydroxide ($Al(OH)_3$), kaolin clays, and other zeolites. Germanium, boron, gallium, titanium and iron can be added in forms corresponding to their aluminum and silicon counterparts. Salts, particularly alkali metal halides such as sodium chloride, can be added to or formed in the reaction mixture. They are disclosed in the literature as aiding the crystallization of zeolites while preventing silica occlusion in the lattice.

In two particular subembodiments, the composition of the reaction mixture from which the zeolite is formed, in terms of elemental molar ratios and seed weight percent, has the following composition ranges:

TABLE 2

| Reactants | 1st Subembodiment | 2nd Subembodiment |
|---|---|---|
| $SiO_2/Al_2O_3$ molar ratio | 1-∞ | 20-150 |
| $Na^+/SiO_2$ molar ratio | 0.05-5 | 0.3-0.6 |
| $R/SiO_2$ molar ratio | 0.001-0.5 | 0.01-0.3 |
| $OH^-/SiO_2$ molar ratio | 0.1-1.0 | 0.3-0.7 |
| $H_2O/SiO_2$ molar ratio | 2-100 | 10-20 |
| Seed* | 0.5-10 wt % | 1-5 wt % |

*The weight percent of the seed is based on the weight percent of $SiO_2$.

As described herein above, for each embodiment described herein, the reaction mixture is formed using at least one active source of an element selected from Groups 1 ($M^+$) and 2 ($M^{2+}$) of the Periodic Table (collectively referred to herein as $M^{n+}$). In one subembodiment, the reaction mixture is formed using at least one active source of an element selected from Group 1 ($M^+$) of the Periodic Table. In one preferred subembodiment, the reaction mixture is formed using an active source of sodium (Na). Any $M^{n+}$-containing compound which is not determined to the crystallization process is suitable. Sources for each Group I($M^+$)/Group II($M^{2+}$) elements include oxides, hydroxides, nitrates, sulfates, halogenides, oxalates, citrates and acetates thereof.

As described above, for each embodiment described herein, the reaction mixture is formed using a SDA (R) in an amount sufficient to form crystals of the zeolite, wherein the SDA is a N,N,N-trialkyl benzyl quaternary ammonium salt represented by general structural formula (1):

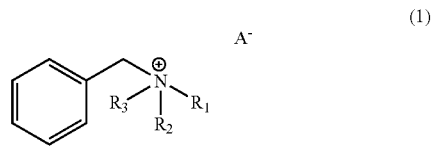

(1)

wherein $R_1$, $R_2$ and $R_3$ are each independently selected from the group consisting of lower alkyl groups, and $A^-$ is an anion which is not detrimental to the crystallization of the zeolite. In one subembodiment, $R_1$, $R_2$ and $R_3$ are each independently selected from the group consisting of a $C_1$-$C_3$ alkyl groups. In another subembodiment, $R_1$, $R_2$ and $R_3$ are each independently selected from the group consisting of a $C_1$-$C_2$ alkyl groups. In another subembodiment, the SDA is a N,N,N-trimethyl benzyl quaternary ammonium salt (e.g. N,N,N-trimethyl benzyl quaternary ammonium hydroxide). In another subembodiment, the SDA is a N,N,N-triethyl benzyl quaternary ammonium salt (e.g. N,N,N-triethyl benzyl quaternary ammonium hydroxide). Representative anions include elements selected from Group 17 of the Periodic Table (such as fluoride, chloride, bromide and iodide), hydroxide, acetate, sulfate and carboxylate. In one subembodiment, the anion is hydroxide.

As noted herein above, the reaction mixture may optionally contain zeolite seed crystals of the CHA framework. In one subembodiment, the seed crystals are zeolite SSZ-13 seed crystals. As it is known in the art, seeding a zeolite reaction mixture with zeolite seed crystals is beneficial for controlling the particle size of the product zeolite, reducing the amount of required SDA, accelerating crystallization, and improving yield. For each embodiment described herein, 0.5-10 percent by weight (wt % based on the weight of the active source for Y) of seed crystals are present in the reaction mixture. In one subembodiment, 0.5-5 wt % is present in the reaction mixture. In another subembodiment, 1-5 wt % is present in the reaction mixture. In another subembodiment, 2-5 wt % is present in the reaction mixture.

For each embodiment described herein, the reaction mixture can be supplied by more than one source. The reaction mixture can be prepared either batch wise or continuously. Crystal size, morphology and crystallization time of the crystalline zeolite described herein may vary with the nature of the reaction mixture and the crystallization conditions.

It will be understood by a person skilled in the art that the reaction mixture having a composition within the molar ranges as discussed above means that the synthesis mixture is the product of mixing, adding, reacting, or by any means of forming the reaction mixture, wherein the product reaction mixture has a composition within the molar ranges/weight percents as discussed above. The product of mixing, adding, reacting, or by any means of providing such a mixture may or may not contain individual ingredients when the synthesis mixture was prepared, and may even be achieved by the formation of a reaction product of individual ingredients when the synthesis mixture was prepared by mixing, adding, reacting, or by any means of providing such a mixture.

Crystallization and Post-Synthesis Treatment

Crystallization of the target zeolites is conducted by hydrothermal crystallization at an elevated temperature and pressure (usually in an autoclave so that the reaction mixture is subject to autogenous pressure until the target zeolite crystals are formed). The temperatures during the hydrothermal crystallization step are typically maintained from about 140° C. to about 200° C. Additionally, the crystallization can be carried out under agitation conditions, such as by stirring or rotation of the reaction vessel.

It is an important feature of the present process that the crystallization of the zeolite is accelerated relative to conventional crystallization methods. Thus, the crystallization time required to form crystals will typically range from about 1 hour to about 100 hours and more frequently from about 3 hours to about 70 hours. In one embodiment, the zeolite is formed during a crystallization time of about 6 hours to about 24 hours. It will be understood by a person skilled in the art that the zeolites described herein may contain impurities, such as amorphous materials; unit cells having framework topologies not described herein; and/or other impurities (e.g., organic hydrocarbons).

Once the zeolite crystals have formed, the crystals may be water-washed, filtered and/or dried (e.g., at 90° C. to 12° C.). The drying step can be performed at atmospheric or subatmospheric pressures.

The "as-synthesized" crystalline zeolite formed by crystallization may be subjected for further treatment. The term "as-synthesized" refers to the zeolite in its form after crystallization, prior to removal of the SDA cation and/or M. The SDA can be removed by thermal treatment (e.g., calcination), preferably in an oxidative atmosphere (e.g., air, gas with an oxygen partial pressure of greater than 0 kPa) at a temperature of between 200° C. and 600° C. Such further treatments include removal of the M cation by ion-exchange using known methods such as using a diluted acid solution (e.g., by exposing the as-synthesized zeolite solution containing a solvated salt of the desired replacing ion or ions, such salts including halide salts and ammonium salt such as hydroxide, ammonium nitrate, ammonium chloride, ammonium sulfate, ammonium phosphate, ammonium carbonate, or any combination thereof).

Metals may also be introduced into the zeolite by replacing some of the cations in the zeolite with metal cations via standard ion exchange techniques (see, for example, U.S. Pat. No. 3,140,249 issued Jul. 7, 1964 to Plank et al.; U.S. Pat. No. 3,140,251 issued Jul. 7, 1964 to Plank et al.; and U.S. Pat. No. 3,140,253 issued Jul. 7, 1964 to Plank et al.). Typical replacing cations can include metal cations selected from the groups 1 through 12 of the Periodic Table, and mixtures thereof, with a preference towards elements from Groups 1, 2 and 8 of the Periodic Table. In one subembodiment, the replacing metallic cation is selected from the group consisting of Mn, Ca, Mg, Zn, Cd, Pt, Pd, Ni, Co, Ti, Al, Sn, Fe, and mixtures thereof.

Typical ion-exchange techniques involve contacting the synthetic zeolite with a solution containing a salt of the desired replacing cation or cations. Although a wide variety of salts can be employed, chlorides and other halides, acetates, nitrates, and sulfates are typically preferred. The zeolite is usually calcined prior to the ion-exchange procedure to remove the organic matter present in the channels and on the surface, since this results in a more effective ion-exchange. Representative ion-exchange techniques are disclosed in a wide variety of patents, including U.S. Pat. No. 3,140,249 issued on Jul. 7, 1964 to Plank et al.; U.S. Pat. No. 3,140,251 issued on Jul. 7, 1964 to Plank et al.; and U.S. Pat. No. 3,140,253 issued on Jul. 7, 1964 to Plank et al.

Following contact with the salt solution of the desired replacing cation, the zeolite is typically washed with water and dried at temperatures ranging from 85° C. to about 120° C. After washing, the zeolite can be calcined in air or inert gas at temperatures ranging from about 200° C. to about 800° C. for periods of time ranging from 1 to 48 hours, or more.

The zeolite can be in the form of a powder, a granule, or a molded product. Where the zeolite is molded into a finished catalyst material, such as by extrusion with an inorganic binder, the zeolite can be extruded before drying, or, dried or partially dried and then extruded.

The following non-limiting examples illustrate the compositions and methods of the present invention.

EXAMPLE 1

An alumina stock solution was prepared by combining 1.71 grams ALUMINASOL AS200 (Nissan Chemical Company), 44.88 grams de-ionized water, 6.93 grams concentrated sodium hydroxide solution (50% w/w) and 2.60 grams 40% benzyltrimethylammonium hydroxide solution (2.39 mmole/gram).

In a reaction vessel, a reaction mixture was formed by combining 9.18 grams of the alumina stock solution with 2.00 grams HI-SIL 233 (PPG Industries, Inc.) and 0.10 grams SSZ-13 seed crystals. The molar composition of the resulting reaction mixture was as indicated in Table 3 below.

TABLE 3

| Reactants | Molar Ratio |
| --- | --- |
| $SiO_2/Al_2O_3$ | 70.16 |
| $Na^+/SiO_2$ | 0.49 |
| $R/SiO_2$ | 0.034 |
| $OH^-/SiO_2$ | 0.53 |
| $H_2O/SiO_2$ | 16.08 |

The reaction mixture was tumble mixed at 43 revolutions-per-minute (rpm) for 8 hours in a preheated 170° C. oven. The product was filtered, washed with de-ionized water and then dried at 120° C. oven to yield 0.59 grams of the target zeolite. The resulting zeolite product was analyzed by powder X-ray diffraction (XRD). The zeolite sample was stabilized in air for about an hour and then pressed into a sample holder. The diffraction pattern scans covered the range of 2° to 52° (2θ). The resulting pattern is shown in FIG. 1. The pattern indicates that the product was SSZ-13, as in agreement with the results indicated in U.S. Pat. No. 4,544,538 to Zones, which issued Oct. 1, 2005.

EXAMPLE 2

In a reaction vessel, a reaction mixture was formed by combining 9.18 grams of the alumina stock solution of Example 1 with 2.00 grams HI-SIL 233 (PPG Industries, Inc.) and 0.10 grams SSZ-13 seed crystals. The molar composition of the resulting reaction mixture was as indicated in Table 4 below.

TABLE 4

| Reactants | Molar Ratio |
| --- | --- |
| $SiO_2/Al_2O_3$ | 70.16 |
| $Na^+/SiO_2$ | 0.49 |
| $R/SiO_2$ | 0.034 |
| $OH^-/SiO_2$ | 0.53 |
| $H_2O/SiO_2$ | 16.08 |

Figure 2:
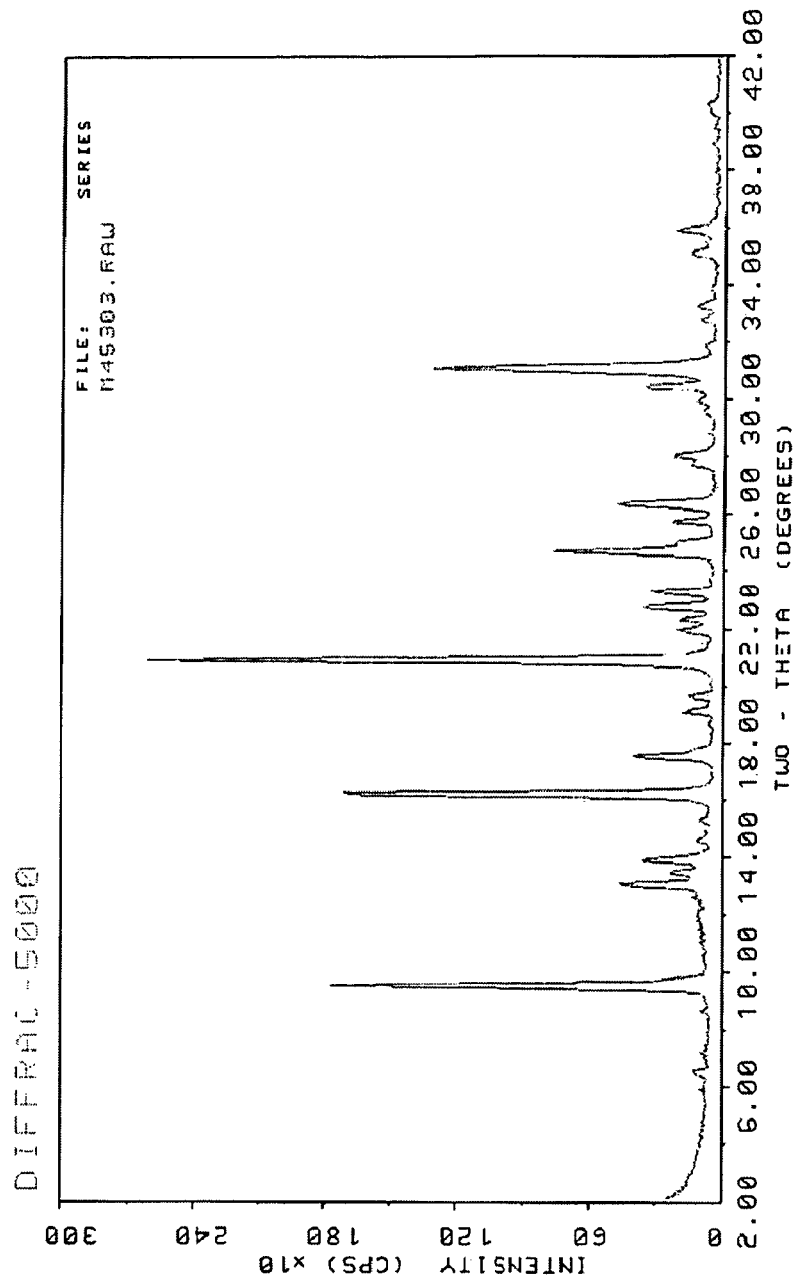
FIG. 2 shows the results of an x-ray powder diffraction analysis of a zeolite prepared per Example 2.

The reaction mixture was tumble mixed at 43 rpm for 16 hours in a preheated 170° C. oven. The product was filtered, washed with de-ionized water and then dried at 120° C. oven to yield 0.67 grams of the target zeolite. The resulting zeolite product was analyzed by powder X-ray diffraction (XRD). The zeolite sample was stabilized in air for about an hour and then pressed into a sample holder. The diffraction pattern scans covered the range of 2° to 52° (2θ). The resulting pattern is shown in FIG. 2. The pattern indicates that the product was SSZ-13, as in agreement with the results indicated in U.S. Pat. No. 4,544,538 to Zones, which issued Oct. 1, 2005.

EXAMPLE 3

In a reaction vessel, a reaction mixture was formed by combining 9.19 grams of the alumina stock solution of Example 1 with 2.00 grams HI-SIL 233 (PPG Industries, Inc.) and 0.10 grams SSZ-13 seed crystals. The molar composition of the resulting reaction mixture was as indicated in Table 4 below.

TABLE 5

| Reactants | Molar Ratio |
| --- | --- |
| $SiO_2/Al_2O_3$ | 70.11 |
| $Na^+/SiO_2$ | 0.49 |
| $R/SiO_2$ | 0.034 |
| $OH^-/SiO_2$ | 0.53 |
| $H_2O/SiO_2$ | 16.09 |

Figure 3:
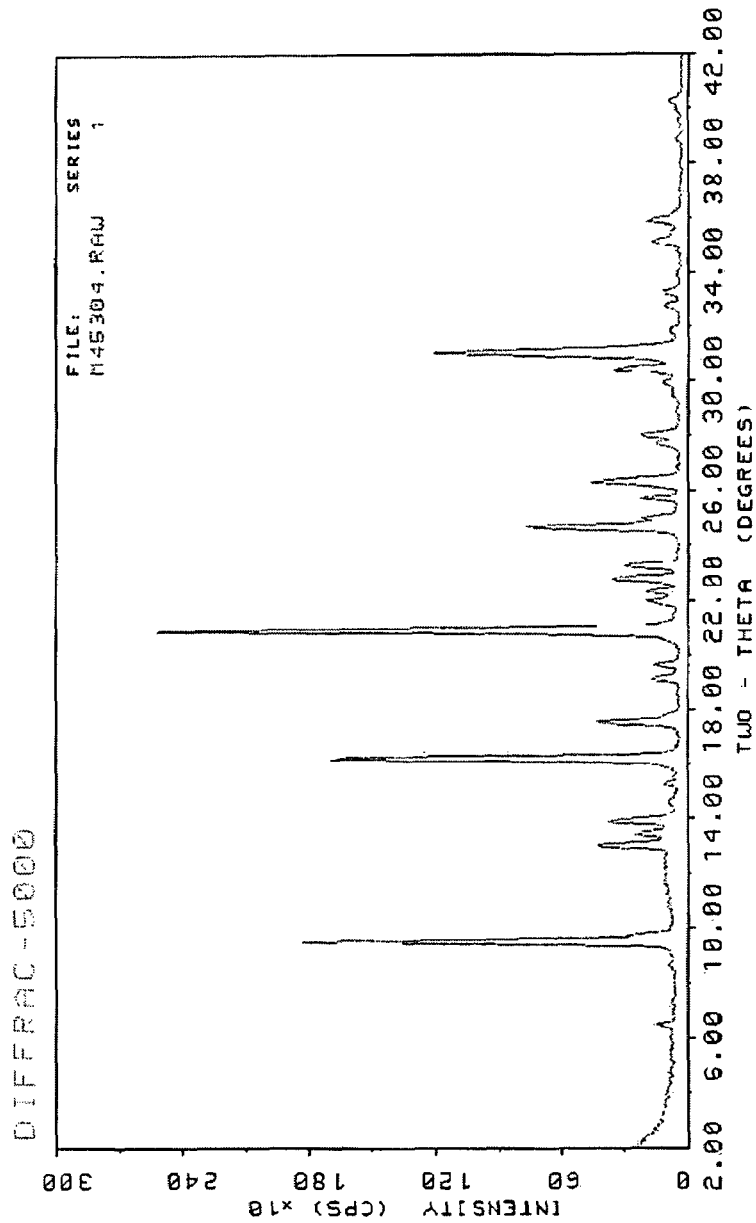
FIG. 3 shows the results of an x-ray powder diffraction analysis of a zeolite prepared per Example 3.

The reaction mixture was tumble mixed at 43 rpm for 24 hours in a preheated 170° C. oven. The product was filtered, washed with de-ionized water and then dried at 120° C. oven to yield 0.65 grams of the target zeolite. The resulting zeolite product was analyzed by powder X-ray diffraction (XRD). The zeolite sample was stabilized in air for about an hour and then pressed into a sample holder. The diffraction pattern scans covered the range of 2° to 52° (2θ). The resulting pattern is shown in FIG. 3. The pattern indicates that the product was SSZ-13, as in agreement with the results indicated in U.S. Pat. No. 4,544,538 to Zones, which issued Oct. 1, 2005.

EXAMPLE 4

In a reaction vessel, a reaction mixture was formed by combining 9.19 grams of the alumina stock solution of Example 1 with 2.00 grams HI-SIL 233 (PPG Industries, Inc.) and 0.10 grams SSZ-13 seed crystals. The molar composition of the resulting reaction mixture was as indicated in Table 6 below.

TABLE 6

| Reactants | Molar Ratio |
| --- | --- |
| $SiO_2/Al_2O_3$ | 70.11 |
| $Na^+/SiO_2$ | 0.49 |
| $R/SiO_2$ | 0.034 |
| $OH^-/SiO_2$ | 0.53 |
| $H_2O/SiO_2$ | 16.09 |

Figure 4:
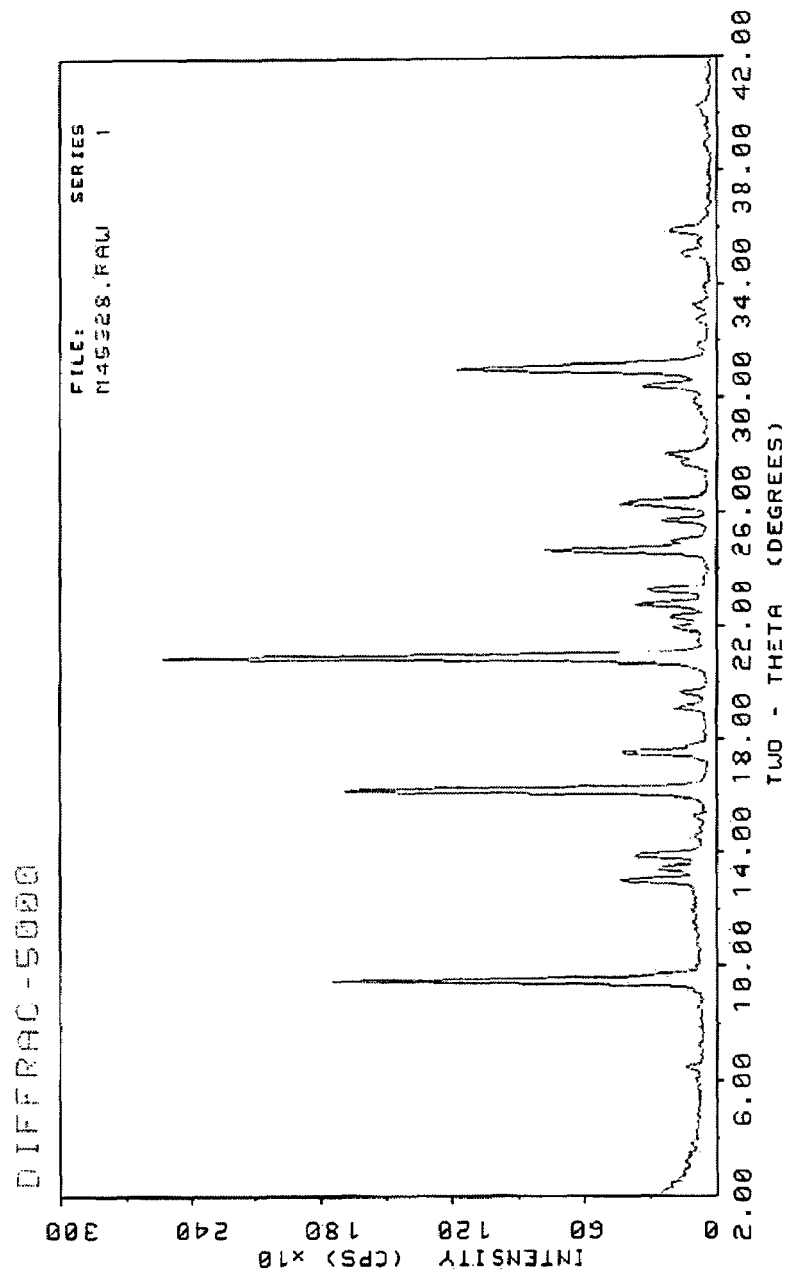
FIG. 4 shows the results of an x-ray powder diffraction analysis of a zeolite prepared per Example 4.

The reaction mixture was tumble mixed at 43 rpm for 40 hours in a preheated 170° C. oven. The product was filtered, washed with de-ionized water and then dried at 120° C. oven to yield 0.69 grams of the target zeolite. The resulting zeolite product was analyzed by powder X-ray diffraction (XRD). The zeolite sample was stabilized in air for about an hour and then pressed into a sample holder. The diffraction pattern scans covered the range of 2° to 52° (2θ). The resulting pattern is shown in FIG. 4. The pattern indicates that the product was SSZ-13, as in agreement with the results indicated in U.S. Pat. No. 4,544,538 to Zones, which issued Oct. 1, 2005.

EXAMPLE 5

In a reaction vessel, 991.4 grams de-ionized water, 173.4 grams sodium hydroxide solution (50% w/w) and 100.0 grams de-ionized rinse water were combined. While mixing with an overhead stirrer, 241.4 grams of a 40% benzyltrimethylammonium hydroxide solution (2.39 mmole/gram) and 100.0 grams de-ionized rinse water were added. Next, 340.0 grams HI-SIL 233 (PGG Industries, Inc.), 17.0 grams of SSZ-13 seed crystals and 10.5 grams BARCROFT 0250 (SPI PHARMA) were added while mixing to form the reaction mixture. The molar composition of the resulting reaction mixture was as indicated in Table 7 below.

TABLE 7

| Reactants | Molar Ratio |
|---|---|
| $SiO_2/Al_2O_3$ | 67.22 |
| $Na^+/SiO_2$ | 0.44 |
| $R/SiO_2$ | 0.11 |
| $OH^-/SiO_2$ | 0.56 |
| $H_2O/SiO_2$ | 16.02 |

The synthesis was carried out in a conventional stirred autoclave at 170° C. for 24 hours. The reactor was stirred at 180 rpm and it was heated to 170° C. over eight hours. The product was filtered, washed with de-ionized water and then dried in 120° C. oven to yield 110.48 grams of the target product zeolite.

Figure 5:
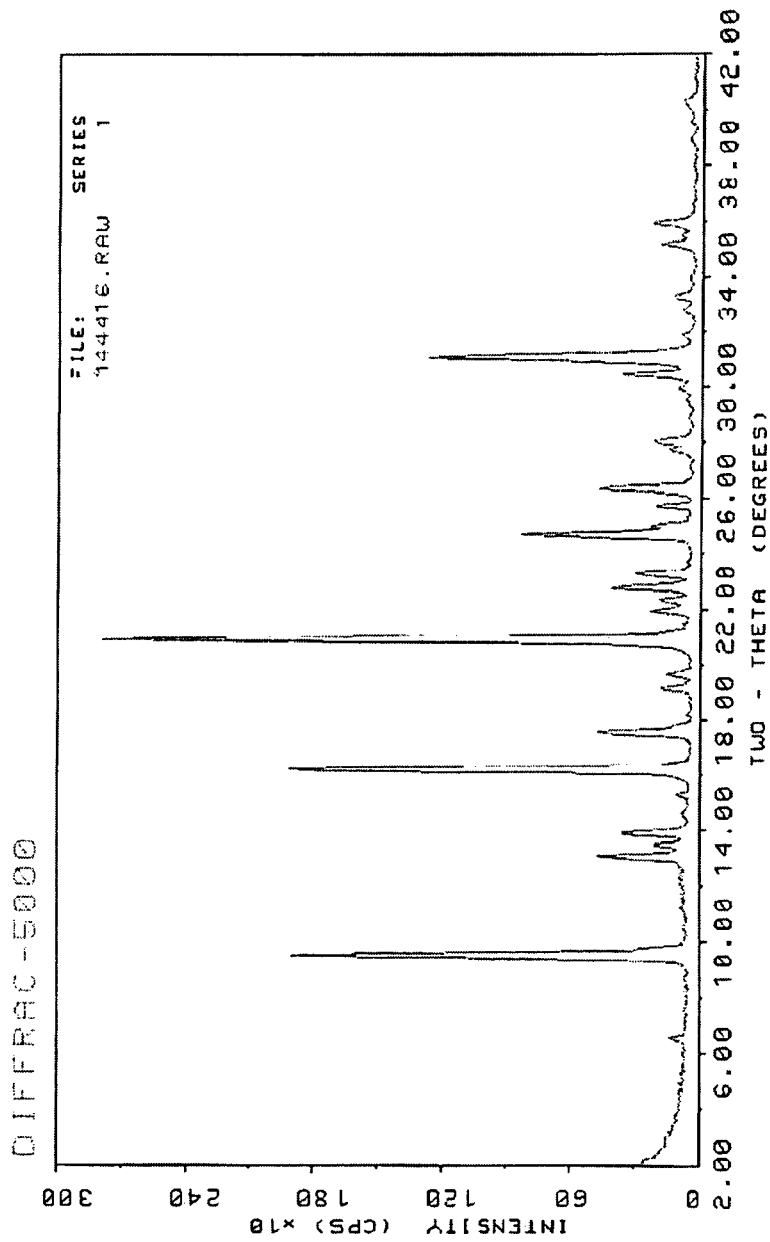
FIG. 5 shows the results of an x-ray powder diffraction analysis of a zeolite prepared per Example 5.

The zeolite was characterized by powder X-ray diffraction (XRD). The zeolite sample was stabilized in air for about an hour and then pressed into a sample holder. The diffraction pattern scans covered the range of 2° to 52° (2θ). The resulting pattern is shown in FIG. 5. The pattern indicates that the product was SSZ-13, as in agreement with the results indicated in U.S. Pat. No. 4,544,538 to Zones, which issued Oct. 1, 2005.

The examples and other embodiments described herein are exemplary and not intended to be limiting in describing the full scope of compositions and methods of this invention. Equivalent changes, modifications and variations of specific embodiments, materials, compositions and methods may be made within the scope of the present invention, with substantially similar results.

What is claimed is:

1. A method for preparing a zeolite having a CHA framework topology, comprising the steps of:
    (1) preparing an aqueous reaction mixture comprising:
        (a) at least one active source of an oxide of a tetravalent element,
        (b) at least one active source of an oxide of a trivalent element, a pentavalent element, a second tetravalent element which is different from the first tetravalent element, or a mixture thereof,
        (c) at least one active source of an element selected from Groups 1 and 2 of the Periodic Table,
        (d) water as a solvent,
        (e) seed crystals capable of forming the CHA zeolite, and
        (f) a structure directing agent in an amount sufficient to form crystals of the zeolite, wherein the structure directing agent is an N,N,N-trialkyl benzyl quaternary ammonium salt represented general structural formula:

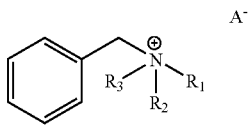

wherein $R_1$, $R_2$ and $R_3$ are each independently selected from the group consisting of lower alkyl groups, and $A^-$ is an anion which is not detrimental to the crystallization of the CHA zeolite; and
    (2) heating the reaction mixture under crystallization conditions for sufficient time to form crystals of the CHA zeolite.

2. The method of claim 1, wherein $R_1$, $R_2$ and $R_3$ are each independently selected from the group consisting of a $C_1$-$C_3$ alkyl groups.

3. The method of claim 1, wherein $R_1$, $R_2$ and $R_3$ are each independently selected from the group consisting of a $C_1$-$C_2$ alkyl groups.

4. The method of claim 1, wherein the N,N,N-trialkyl benzyl quaternary ammonium salt is N,N,N-triethyl benzyl quaternary ammonium hydroxide.

5. The method of claim 1, wherein the N,N,N-trialkyl benzyl quaternary ammonium salt is N,N,N-trimethyl benzyl quaternary ammonium hydroxide.

6. The method of claim 1, wherein the reaction mixture comprises 0.5%-5% by weight of seed crystals, wherein the weight percent of the seed crystals is based on the weight percent of the at least one active source of the oxide of the first tetravalent element.

7. The method of claim 1, wherein the seed crystals are SSZ-13 seed crystals.

8. The method of claim 1, wherein the reaction mixture has a composition in terms of mole ratios falling within the ranges below:

| | |
|---|---|
| Y/W molar ratio | 1-∞ |
| $M^{n+}/Y$ molar ratio | 0.05-5 |
| R/Y molar ratio | 0.001-0.5 |
| $OH^-/Y$ molar ratio | 0.1-1.0 |
| $H_2O/Y$ molar ratio | 2-100 |
| seed | 0.5-10 wt % | wherein:
    (i). Y is selected from the group consisting of elements from Groups 4-14 of the Periodic Table,
    (ii). W is selected from the group consisting of elements from Groups 3-13 of the Periodic Table,
    (iii). R is the structure directing agent, and
    (iv). $M^{n+}$ is selected from the group consisting of elements from Groups 1 and 2 of the Periodic Table; and
wherein the weight percent (wt %) of the seed is based on the weight percent of the at least one active source of the oxide of Y.

9. The method of claim 8, wherein the Y/W molar ratio is from 10-75.

10. The method of claim 8, wherein Y is selected from the group consisting of Ge, Si, and mixtures thereof.

11. The method of claim 10, wherein Y is Si.

12. The method of claim 8, wherein W is selected from the group consisting of Ga, Al, Fe, B, Ti, In, and mixtures thereof.

13. The method of claim 1, wherein the reaction mixture has a composition in terms of mole ratios falling within the ranges below:

| | |
|---|---|
| Y/W molar ratio | 10-75 |
| $M^{n+}/Y$ molar ratio | 0.3-0.6 |
| R/Y molar ratio | 0.01-0.3 |
| $OH^-/Y$ molar ratio | 0.3-0.7 |
| $H_2O/Y$ molar ratio | 10-20 |
| seed | 1-5 wt % | wherein:
    (i). Y is selected from the group consisting of elements from Groups 4-14 of the Periodic Table,
    (ii). W is selected from the group consisting of elements from Groups 3-13 of the Periodic Table,
    (iii). R is the structure directing agent, and (iv). $M^{n+}$ is selected from the group consisting of elements from Groups 1 and 2 of the Periodic Table; and wherein the weight percent (wt %) of the seed is based on the weight percent of the at least one active source of the oxide of Y.

14. The method of claim 13, wherein Y is selected from the group consisting of Ge, Si, and mixtures thereof.

15. The method of claim 14, wherein Y is Si.

16. The method of claim 14, wherein W is selected from the group consisting of Ga, Al, Fe, B, Ti, and In, and mixtures thereof.

17. The method of claim 1, wherein the reaction mixture has a composition in terms of mole ratios falling within the ranges below:

| | |
|---|---|
| $SiO_2/Al_2O_3$ molar ratio | 1-∞ |
| $Na^+/SiO_2$ molar ratio | 0.05-5 |
| $R/SiO_2$ molar ratio | 0.001-0.5 |
| $OH^-/SiO_2$ molar ratio | 0.1-1.0 |
| $H_2O/SiO_2$ molar ratio | 2-100 |
| seed | 0.5-10 wt % | wherein R is the structure directing agent; and wherein the weight percent (wt %) of the seed is based on the weight percent of $SiO_2$.

18. The method of claim 17, wherein the seed crystals are SSZ-13 seed crystals.

19. The method of claim 1, wherein the reaction mixture has a composition in terms of mole ratios falling within the ranges below:

| | |
|---|---|
| $SiO_2/Al_2O_3$ molar ratio | 20-150 |
| $Na^+/SiO_2$ molar ratio | 0.3-0.6 |
| $R/SiO_2$ molar ratio | 0.01-0.3 |
| $OH^-/SiO_2$ molar ratio | 0.3-0.7 |
| $H_2O/SiO_2$ molar ratio | 10-20 |
| seed | 1-5 wt % | wherein R is the structure directing agent; and wherein the weight percent (wt %) of the seed is based on the weight percent of $SiO_2$.

20. The method of claim 19, wherein the seed crystals are SSZ-13 seed crystals.

* * * * *